United States Patent [19]

Bajc et al.

[11] Patent Number: 5,194,503
[45] Date of Patent: Mar. 16, 1993

[54] NON-ISOCYANATE FLEXIBILIZER FOR COATINGS

[75] Inventors: Gerald L. Bajc, Perrysburg; Thomas E. Noseworthy, Waterville; James M. Cameron, Toledo, all of Ohio

[73] Assignee: BASF Corporation, Parsippany, N.J.

[21] Appl. No.: 909,894

[22] Filed: Jul. 7, 1992

[51] Int. Cl.$^5$ ............................................. C08L 75/00
[52] U.S. Cl. ................... 525/123; 525/424; 525/440; 525/452; 525/457; 525/458; 525/459; 525/460; 528/49
[58] Field of Search ............... 525/123, 424, 440, 452, 525/457, 458, 459, 460; 528/49

[56] References Cited

U.S. PATENT DOCUMENTS 4,329,442  5/1982  Pokovny ........................... 528/49

Primary Examiner—Maurice J. Welsh
Attorney, Agent, or Firm—Michael R. Chipaloski

[57] ABSTRACT

A non-isocyanate flexibilizer additive is provided which finds utility in coating systems such as alkyds, polyesters, acrylic/polyester, alkyd/acrylic, carboxy/epoxy, polyether/urethane, epoxy/polyester, other epoxy, and urea and melamine formaldehyde systems. The non-isocyanate functional flexibilizer has the formula; B—C(O)—NW—A—NX—C(O)—K wherein A is selected from the group consisting fundamentally of polyesters, polyamides, polyureas, polyurethanes, acrylics; biuret, allophonate and urethane extended polyesters; wherein B and K are selected from the group consisting of —OR and —Z—R'—SiOR''$_{(3-n)}$R'''$_n$ wherein R' is a divalent lower alkyl radical of from 1 to 18 carbon atoms, R is a lower alkyl radical of from 1 to 18 carbon atoms, Z is a member selected from the group consisting of S and NR'', W and X are selected from H and lower alkyl radicals of from 1 to 10 carbon atoms, wherein R'', R''' and R'''' are H or a lower alkyl radical of from 1–18 carbon atoms, and wherein n is 0, 1 or 2. Also included are biuret and allophonate products of the above formula with isocyanate functional materials.

9 Claims, No Drawings

NON-ISOCYANATE FLEXIBILIZER FOR COATINGS

FIELD OF THE INVENTION

The present invention relates to flexibilizer additives useful in automotive paint compositions. More particularly, it relates to non-isocyanate functional flexibilizers which can be added to paint compositions by an end user at point of application or incorporated into a product provided to the end user.

BACKGROUND OF THE INVENTION

Present day automobiles contain flexible plastic parts such as urethane bumpers, filler panels, fender extensions, vinyl tops, and padded dashboards. These parts require greater flexibility than is inherent in many paints, especially lacquers. Conventional non-isocyanate flexibilizer additives, while providing good flexibility, have a detrimental effect on the resultant film by making it very susceptible to dirt pick-up. While isocyanate functional materials can increase resistance to dirt pick-up, the perceived adverse health effects attributed to isocyanates make this an unacceptable approach in some market niches.

SUMMARY OF THE INVENTION

The present invention provides a non-isocyanate flexibilizer additive for coatings which exhibits enhanced resistance to dirt pick-up.

The non-isocyanate functional flexibilizer of the present invention are those described by the following formula I:

wherein A is selected from the group consisting fundamentally of polyesters, polyamides, polyureas, polyurethanes, acrylics; biuret, allophonate and urethane extended polyesters; wherein B and K are selected from the group consisting of —OR and —Z—R'—SiOR"-$_{(3-n)}$R""'$_n$ wherein R' is a divalent lower alkyl radical of from 1 to 18 carbon atoms, R is a lower alkyl radical of from 1 to 18 carbon atoms, Z is a member selected from the group consisting of S and NR", W and X are selected from H and lower alkyl radicals of from 1 to 10 carbon atoms wherein R", R"', and R"" are H or a lower alkyl radical of from 1–18 atoms, and wherein n is 0, 1 or 2. Also included are biuret and allophonate products of I with isocyanate functional materials.

These compositions may also include a conventional silanol condensation catalyst such as dibutyl tin dilaurate, dibutyl tin diacetate, gamma-aminopropyltrimethoxysilane, amines, alkyl titanate, basic catalyst and acidic catalyst.

The flexibilizers of the present invention are useful in a wide variety of coating systems, including systems, including alkyds, polyesters, acrylic/polyester, alkyd/acrylic, carboxy/epoxy, polyether/urethane, epoxy/polyester, other epoxy, and urea and melamine formaldehyde systems. The flexibilizers are especially useful in conventional acrylic lacquer primers, acrylic lacquer basecoats, acrylic lacquer topcoats, acrylic lacquer clearcoats, acrylic enamel topcoats, high solids urethane acrylic clearcoats, acrylic clearcoats, and high solids single stage. Additional the flexibilizers are useful as a gravel protector coating on automobile parts such as rocker panel areas. They are useful at both ambient temperature cure and force dry conditions and are especially useful in, but not limited to, automotive refinish applications.

In addition, a process for preparing a condensation polymer is disclosed which comprises polymerizing the reactants for a portion of the process time without the removal of condensate, and then polymerizing in the conventional manner. This provides better production processing without excess glycol loss. This process finds utility in preparing the product of the present invention as well as in preparing esterification polymers in general.

Also included are coating compositions which comprise a conventional lacquer and an effective amount of the flexibilizer additive. Typically the additive is present in an amount of from about 2% to about 80% by weight; more preferably from about 4% to about 40% by weight.

Coatings which include the flexibilizer do not contain apparent haze, remain flexible even after heat aging, and do not pick up dirt.

DESCRIPTION OF THE PREFERRED EMBODIMENT

The non-isocyanate functional flexibilizers of the present invention are described by formula I:

wherein A is selected from the group consisting fundamentally of polyesters, polyamides, polyureas, polyurethanes, acrylics; biuret, allophonate and urethane extended polyesters; wherein B and K are selected from the group consisting of —OR and —Z—R'—SiOR"-$_{(3-n)}$R""'$_n$ wherein R' is a divalent lower alkyl radical of from 1 to 18 carbon atoms, R is a lower alkyl radical of from 1 to 18 carbon atoms, Z is a member selected from the group consisting of S and NR", W and X are selected from H, and lower alkyl radicals of from 1 to 10 carbon atoms wherein R"R", and R"" are H or a lower alkyl radical of from 1-18 carbon atoms, and wherein n is 0, 1 or 2. Also included are biuret and allophonate products of I with isocyanate functional materials.

Particularly preferred, is a non-isocyanate functional flexibilizer wherein B comprises (based on equivalents) from about 10 mole percent to 100 mole percent —Z—R'—SiOR"$_{(3-n)}$R""'$_n$ and from about 90 mole percent to 0 mole percent —OR, wherein R' an R are a lower alkyl radical of from 1 to 18 carbon atoms, Z is selected from the group consisting of S and NR", and wherein R" and R"" are H or a lower alkyl radical of from 1-18 carbon atoms.

The flexibilizers are those which result when a hydroxyl-bearing polyester or polyurethane (part 1), is reacted with an excess of multi-functional isocyanate (part 2), which is subsequently reacted with a monoalcohol such as n-butanol and a functional silane such as gamma-Aminopropyltrimethoxysilane through available excess isocyanate (part 3). A small amount of unreacted isocyanate remains which is reacted with a monoalcohol such as ethanol.

According to the preferred process for preparing these condensation polymers, the reactants for a portion of the process time are polymerized without the removal of condensate, and then polymerization is continued in the conventional manner. Its utility is pertinent to this invention as well as esterification polymers in general.

Preferred is a flexibilizer in which component A in formula I is an isocyanate functional polyurethane which results when a dipropylene glycol adipate of dipropylene glycol and adipic acid of a calculated number average molecular weight of about 2000 to about 4000 and ahydroxyl number, based on non-volatile, of about 25 to 37, which is then capped with trimethylhexamethyl- enediisocyanate. This polyurethane polyester is subsequently reacted with n-butanol (component B in formula I) and gamma- aminopropyltrimethoxy silane (component K in formula I). In this preferred flexibilizer, referring still to formula I, R' is a propyl alkyl radical (between the amine and the Si), R" a methyl radical (attached to o attached to the Si) and R is a butyl radical.

One may also employ low molecular weight polyesters extended with aliphatic diisocyanate. Also contemplated is the use of polyesters with branching monomers such as pentaerythritol, trimethylol propane, trimethylol propane and the like as well as other diols such as cyclohexane dimethanol. A low Tg, low molecular weight acrylic of less than 25° C. may also be employed.

These flexibilizers may also include a conventional silanol condensation catalyst such as dibutyl tin dilaurate, dibutyl tin diaoetate, gamma-aminopropyltrimethoxysilane, amines, alkyl titanate, basic catalyst and acidic catalyst.

One preferred flexibilizer is an isocyanate terminated polyester reacted (based on isocyanate equivalents) with about 10 to 100 mole percent gamma-Aminopropyltrimethoxysilane, 0 to 90 mole percent n-butanol, 0 to 5 mole percent ethanol, and 0.5 to 2 weight percent dibutyl tin dilaurate catalyst based on total non-volatile.

The additive of the present invention can be applied to and will function well on all interior and exterior automotive flexible parts including urethane bumpers, filler panels, fender extensions, vinyl tops, and padded dashboards. It is also useful as a gravel protector for rocker panel areas. The additive is isocyanate-free, is clear and, when added to acrylic topcoat colors, provides excellent performance properties in refinishing exterior automotive flexible parts and fascia. It is resistant to dirt pick-up, resilient, flexible even at low temperature, fast drying and has high gloss and excellent physical properties. It also provides improved exterior fade resistance, water and gasoline resistance and is durable. It may also be employed in acrylic lacquers designed for use on interior automotive parts.

Also included are flexible coating compositions for metal and plastic substrate, which comprise a coating system and an effective amount of the flexibilizer additive. Typically the additive is present in an amount of from about 2% to about 80% by non-volatile weight; more preferably from about 4% to about 40% by non-volatile weight. These coating compositions may also include conventional additives such as wetting agents, anti-settling agents and ultra violet absorbers.

Coatings which include the flexibilizers of the present invention do not contain apparent haze, remain flexible even after heat aging, and do not pick up dirt when tested as described below.

The following examples are presented in order to illustrate the present invention without limiting its scope. All raw materials (except those prepared in the examples) were commercially available and were used as supplied.

In the following examples, the results were evaluated using the following test methods:

A. Flexibility: painted 5"×4"×⅛" polyurethane test panels cured overnight at ambient room temperature were bent around a cylinder (4"×3¼" diam) once and observed for cracks or paint splitting. If the sample passed flexibility, then the same test panel and cylinder were placed in a cooling chamber at 50° F. for on hour before bending and evaluating for flexibility. If the sample passed, then the test panel was placed in a 140° F. oven for periods of 1 day, 1 week, 1 month, 2 months till failure. Each time the test panel was removed from the 140° F. oven and allowed to cool to room temperature before flexing over the cylinder.

B. Dirt Resistance: painted 5"×4"×⅛" polyurethane test panels were cured overnight at ambient room temperature and were tested at room temperature. A Dietz Junior No.20 hurricane lantern (about 12" high including chimney with chimney raised about an inch (total 13") to allow air to reach the wick to give about a 2" flame) with a sooty flame was used to determine dirt resistance. A test panel was placed on the chimney top and exposed to the sooty flame for one minute. The blackened panel was evaluated for dirt resistance by drawing a clean, dry finger across the blackened surface. Removal of all the soot in the finger's path indicated excellent dirt resistance.

C. Water Resistance: two one milliliter deionized water drops were applied to panels that had been cured overnight and the panels were then placed in a 120° F. oven until the water evaporated. One spot wiped clean was compared to an adjacent water spot and rated on a scale of 1–10.

D. Print Resistance: test panels cured overnight were placed into a 120° F. oven for two minutes. A two square inch paper pad (¼" thick) and 500 gram weight were placed on the test panels for 2 minutes. The panels were then removed from the oven and rated on a scale of 1–10.

E. Gasoline Resistance: one 1 ml. unleaded gasoline was applied for five minutes at room temperature to test panels that had been cured overnight for 5 minutes at room temperature. The panels were then evaluated for film disturbance and recovery.

F. Adhesion Test: test panels cured overnight were cut through to the substrate with a crosshatch knife in perpendicular directions. An adhesive tape was secured firmly to the film then pulled away rapidly. Adhesion was rated on a scale of 1–10.

G. Humidity Resistance: test panels cured for one week were placed into a humidity cabinet (100° F., 100% R. H.) for 24 hours, removed for a 15 minute recovery then checked for adhesion. This cycle was repeated 5 times and panels were rated on a scale of 1–10.

H. Water Spray: test panels cured for one week were placed into a water spray cabinet (72° F.) for 48 hours followed by a 24 hr. recovery at room temperature. Panels were then checked for adhesion. This cycle was repeated 5 times and the panels rated on a scale of 1–10. scale.

I. OUV (GM cycle, accelerated weathering): test panels cured for two weeks were placed into QUV (313 nanometer wavelength) after determining 20 degree gloss. Appearance and gloss were checked weekly and panels were rotated to ensure uniform exposure until failure.

J. Xenon Weatherometer: test panels cured for two weeks were placed into a weatherometer after determining 20° gloss. Appearance and gloss were checked weekly and panels were rotated to ensure uniform exposure until failure.

EXAMPLE

Example 1

Polyester

Part A: A reactor fitted with agitator, addition ports, packed column (with thermocouple probe at its top), reflux condenser, thermocouple probe, and inert gas inlet was charged with commercially available 6380 gm. dipropylene glycol and 6490 gm. of adipic acid. The reactor was purged with nitrogen while the mixture was heated to 99°-105° C. with stirring. A trace stream of nitrogen was passed through the system after purging. At 99°-105° C., 16.2-16.7 gm. of Air Products T-12 (dibutyl tin dilaurate) was added while the reactor continued heating. The reactor began to reflux at about 166° C. with the temperature at the top of the packed column at about 98° C. After about 5.25 hours at reflux, the reactor was cooled under increased nitrogen flow. Acid number was monitored throughout reaction and was approximately 230 on theoretical solids at this point.

Part B: The reactor was fitted with a Barrett trap filled with toluene, below the condenser but after the packed column to receive condensate. The reactor was purged with nitrogen, with a trace flow of nitrogen remaining after purging, while heating Part A to reflux. Condensate began to collect in the trap at about 127° C. (98° C. temperature at top of packed column). As more condensate collected, the top of the packed column dropped to about 83° C. Intermittent temperature rise occurred when the trap was drained of condensate for collection jars. After about 1017 gm. of condensate was formed, the temperature at the top of the packed column began to rise. About 298 gm. of toluene was added to the reactor through the top of the condenser to maintain the packed column head temperature about 83° C. during removal of this 1017 condensate, with an additional 120 added afterwards. A few seconds of intermittent cooling was used when the condenser was overwhelmed. After about 6.5 hours at reflux the acid number was 80 based on theoretical non-volatile. After about 7.25 hours at reflux the nitrogen flow was increased and the batch cooled.

Part C: The reactor with product of Part B was purged with nitrogen, with a trace flow of nitrogen remaining after purging, while heating to reflux. The reactor was held at reflux, adjusting with toluene to maintain temperature below 235° C. using intermittent cooling (and intermittent increases in nitrogen flow) where necessary to make adjustments. About 1036 gm. of toluene was used for adjustment. Samples were removed for acid number monitoring. After about 7.5 hours at reflux, acid number was 1-2. After about 7.75 hours at reflux, the nitrogen flow was increased, and toluene was slowly pumped through a reactor port into the batch blowing over residual water from the batch and reactor risers; the reactor was cooled and nitrogen flow increased even higher. More toluene was added through the condenser. These last two additions totaled about 1473 gm. Total condensate collected from Part A-C Was about 1560 gm. Gas chromatograph revealed only trace dipropylene glycol loss in condensate.

The properties of the resin were 86-87% non-volatile (0.9-1.1 gm. sample in 2-4 ml toluene for 60 minutes at 105°-115° C.); 1-2 acid number based on the above non-volatile, viscosity of Z-Z1, and V-W reduced to 80% with toluene and a hydroxyl number of 23-27 on solution. Differences between determined non-volatile and theoretical are likely the result of solvent loss during processing.

Example 2

Urethane Intermediate

| A) | Toluene | 844 |
|---|---|---|
|  | Trimethyl-hexamethylenediisocyanate | 198 |
|  | Toluene | 160 |
|  | EXAMPLE 1 | 1802 |
| B) | Dibutyl tin dilaurate | .82 |
|  | (Air Products T-12) |  |
|  | Toluene | 47 |

A flask was charged with A) and equipped with agitator, addition ports, condenser, thermocouple probe, and inert gas inlet. It was then heated to 65°-70° C. under nitrogen blanket. A trace nitrogen flow was maintained throughout procedure. At 65°-70° C. B) was added. Batch was held until isocyanate level was 1.33-1.36 percent and then cooled.

Example 3

| A) | Product of Example 2 | 300 |
|---|---|---|
| B) | Toluene | 11 |
|  | Gamma-Aminopropyltrimethoxysilane | 15.9 |
| Approximate Amount Out For Sampling | | (11) |
| C) | Ethanol | 2.6 |
| D) | Dibutyl tin dilaurate | 2.38 |
|  | Toluene | 10 |
| Approximate Amount Out For Sampling | | (11) |
| E) | Toluene | 199 |
|  | Methyl ethyl ketone | 374 |
|  | Propylene glycol monomethyl ether acetate | 35 |

A flask was charged with A) and equipped with agitator, addition ports, condenser, thermocouple probe, and inert gas inlet. It was then heated to 24°-28° C. under nitrogen blanket. A trace flow of nitrogen was maintained throughout procedure. B) was added while cooling to maintain temperature below 37° C. with most of the time below 30° C. Isocyanate level was checked. After about 50 minutes, C) was added and the batch heated to 65°-70° C. and then D) was added. The batch was held until essentially no isocyanate peak was observable on an infrared spectrometer and then E) was added.

Example 4

| A) | Product of SAMPLE 2 | 380 |
|---|---|---|
| B) | n-Butanol | 2.2 |
| C) | Toluene | 10 |
|  | Gamma-Aminopropyltrimethoxysilane | 4.6 |
| Approximate Amount Out For Sampling | | (06) |
| D) | Ethanol | 5.2 |
| E) | Dibutyl tin dilaurate | 2.8 |
|  | Toluene | 10 |
| F) | Toluene | 256 |
|  | Methyl ethyl ketone | 468 |
|  | Propylene glycol monomethyl ether acetate | 44 |

A flask was charged with A) and B) and equipped with agitator, addition ports, condenser, thermocouple probe, and inert gas inlet. It was heated to 65°-70° C. under nitrogen blanket. A trace of nitrogen was maintained throughout procedure. The material was held at this temperature and isocyanate level monitored until 0.98-1.02 percent (on solution). Batch was cooled down to 25°-28° C. and C) added. Batch was held about 50 minutes temperature maintained below 37° C., and D) was added. Subsequently the material was heated to 65°-70° C. and E) was added. Batch was held at 65°-70° C. until essentially no isocyanate peak was observable on an infrared spectrometer and then F) added.

Example 5

| A) | Product of EXAMPLE 2 | 600 |
|---|---|---|
| B) | n-Butanol | 10.6 |
| Approximate Removed for Samples | | (34) |
| C) | Toluene | 10 |
| | Gamma-Aminopropyltrimethyoxysilane | 7.2 |
| Approximate Amount Out For Sampling | | (10) |
| D) | Ethanol | 5 |
| E) | Dibutyl tin dilaurate | 4.3 |
| | Toluene | 10 |
| Approximate Amount Out For Sampling | | (12) |
| F) | Toluene | 391 |
| | Methyl ethyl ketone | 695 |
| | Propylene glycol monomethyl ether acetate | 65 |

A flask was charged with A) and B) and equipped with agitator, addition ports, condenser, thermocouple probe, and inert gas inlet. It was heated to 65°-70° under nitrogen blanket. A trace of nitrogen was maintained throughout procedure. The temperature was held seven hours during which isocyanate value was checked. The flask was sealed up, nitrogen stream maintained, and let set overnight. Subsequently it was heated to 65°-70° C. and held about 6 hours, checking isocyanate value, until isocyanate value was 0.30-0.32%. The material was cooled under nitrogen to 25° C. and C) added while cooling to control exotherm. Temperature was kept below 26° C. Product was held about 40 minutes and then D) added. The material was heated to 65°-70° C. and E) added. Material was held at this temperature until essentially no isocyanate peak was observable on an infrared spectrometer and F) added.

Example 6

| A) | Product of EXAMPLE 2 | 322 |
|---|---|---|
| | n-Butanol | 3.8 |
| Approximate Removed for Samples | | (15) |
| B) | Toluene | 10 |
| | Gamma-Aminopropyltrimethoxysilane | 7.1 |
| Approximate Amount Out For Sampling | | (06) |
| C) | Ethanol | 5 |
| D) | Dibutyl tin dilaurate | 2.37 |
| | Toluene | 10 |
| E) | Toluene | 214 |
| | Methyl ethyl ketone | 397 |
| | Propylene glycol monomethyl ether acetate | 37 |

A flask was charged with A). The flask was equipped with agitator, addition ports, condenser, thermocouple probe, and inert gas inlet. It was heated to 65°-70° C. under nitrogen blanket. A trace of nitrogen was maintained throughout procedure. The temperature was held about 5.5 hours during which isocyanate value was checked. At 0.57-0.59%, material was cooled to 25° C. and C) added while cooling to control exotherm keeping temperature below 33° C. (mostly below 30° C.). After about 45 minutes C) was added to the flask and the flask heated to 65°-70° C. after which D) was added. Material was held at this temperature until no isocyanate peak was observable on an infrared spectrometer. Component E) was then added.

Example 7

| A) | Product of EXAMPLE 2 | 108.7 |
|---|---|---|
| B) | Toluene | 10 |
| | Gamma-Aminopropyltrimethoxysilane | 5.5 |
| Approximate Amount Out For Sampling | | (14) |
| C) | Ethanol | 1.5 |
| D) | Dibutyl tin dilaurate | .76 |
| | Toluene | 10 |
| E) | Toluene | 56 |
| | Methyl ethyl ketone | 128 |
| | Propylene glycol monomethyl ether acetate | 12 |

A flask was charged with A) and equipped with agitator, addition ports, condenser, thermocouple probe, and inert gas inlet. The flask was purged with nitrogen and a blanket maintained throughout procedure. The flask was cooled and B) added over about 2 minutes. The temperature rose from about 16° to 20° C. After about 1 hour the flask was heated to about 30° C. After about 40 minutes C) was added and flask heated to 65°-70° C. after which D) was added. Material was held until essentially no isocyanate peak was observable on an infrared spectrometer and E) added.

Example 8

White Acrylic Lacquer Topcoat

| | Parts by Volume |
|---|---|
| Titanium dioxide acrylic lacquer | 444.50 |
| Product of EXAMPLE 5 | 333.30 |
| Aliphatic/Aromatic/Ester/Ketone Acrylic Lacquer Thinner | 222.20 |
| | 1,000.00 |
| % Non Volatile: 20.39% (wt.) | |

The above lacquer, flex agent and lacquer thinner are sold commercially as A-2080, and PNT-90 by BASF Corporation. The experimental material was applied by air atomization over primed cold rolled steel and polyurethane plastic panels. The coating was allowed to cure at ambient room temperature overnight while some panels cured one week prior to testing. Dry film thickness was measured and determined to be approximately 1.8-2.2 mils of white acrylic lacquer. The cured film demonstrated good substrate adhesion, flexibility, dirt (chemical) resistance, etc. as shown below:

| Gloss (20 degree meter): | 58° |
|---|---|
| Humidity (100% R.H. for 96 hours, 100° F.) | Excellent |
| Flexibility: | Excellent |
| Dirt Resistance: | Excellent |
| Adhesion: | Excellent |
| Water Spray (72° for 48 hrs with 24 hrs. recovery) 5 cycles: | Excellent |
| Gasoline Resist: | Excellent |
| Water Spot: | Excellent |
| Print: | Excellent |
| Q.U.V. (313 nanometer, GM Cycle) | Excellent |
| Weatherometer (Xenon): | Excellent |

Example 9

Acrylic Lacquer Clearcoat

An acrylic lacquer clearcoat was prepared as follows:

| | |
|---|---|
| Acrylic Lacquer Clearcoat | 352.90 |
| Product of EXAMPLE 5 | 294.20 |
| Aliphatic/Aromatic/Ester/Ketone Acrylic Lacquer Thinner | 352.90 |
| TOTAL | 1,000.00 |
| % Non Volatile: 17.57% (WT.) | |

The above acrylic lacquer clearcoat and lacquer thinner are sold commercially as #727 and PNT-88 by BASF Corporation. This coating was applied by air atomization over APS-422 primed and Alpha-Cryl basecoated cold rolled steel and polyurethane plastic panels.

The coating was allowed to cure at ambient room temperature overnight while some panels cured on week prior to testing. Dry film thickness was measured and determined to be approximately 2.0 mils of clearcoat.

The cured film demonstrated good substrate adhesion, flexibility, dirt resistance etc., as shown below:

| | |
|---|---|
| Gloss (20° head): | 70.0 |
| Water Spot: | Good |
| Flexibility: | Excellent |
| Humidity: | Excellent |
| Dirt Resistance: | Excellent |
| QUV: | Excellent |
| Adhesion: | Excellent |
| Water Spray: | Excellent |
| Gas Resistance: | Excellent |
| Print: | Excellent |

Example 10

Acrylic Primer

An acrylic iron oxide primer was prepared as follows:

| | Parts by Volume |
|---|---|
| Acrylic iron oxide primer | 333.30 |
| Product of EXAMPLE 5 | 166.70 |
| Aliphatic/Aromatic/Ester/Ketone Acrylic Lacquer Thinner | 500.00 |
| TOTAL | 1,000.00 |
| % N.V. = 20.95% | |

The above acrylic primer and solvent are sold commercially as APS-422 and PNT-88 by BASF Corporation.

This material was applied by air atomization over cold rolled steel and polyurethane plastic panels. The coating was allowed to cure at ambient room temperature overnight while some panels cured one week prior to testing. The primer film was sanded lightly with 320 grit sand paper prior to being basecoated, topcoated, clearcoated separately with each of the chemical coatings evaluated in this application. Dry film thickness was measured and determined to be approximately 1.5 mils of primer and cured films demonstrated good substrate adhesion and flexibility as indicated in the performance characteristics of each of the coating in this review.

Examples 11 and 12

White and Black Acrylic Enamel

White and Black acrylic enamels were prepared as follows:

| | Parts by Volume |
|---|---|
| White Acrylic enamel | 381.0 |
| Polyurethane Crosslinker | 47.5 |
| Product of EXAMPLE 5 | 381.0 |
| Aliphatic/Aromatic/Ketone/Ester Acrylic Enamel Thinner | 190.5 |
| Total | 1,000.00 |
| % Non Volatile: 30.18% (wt.) | 381.0 |
| Black Acrylic Enamel | |
| Polyurethane Crosslinker | 47.5 |
| EXAMPLE 5 | 381.0 |
| Aliphatic/Aromatic/Ketone/Ester Acrylic Enamel Thinner | 190.5 |
| TOTAL | 1,000.0 |
| % Non Volatile: 26.33% (wt.) | |

The above acrylic enamels, polyurethane crosslinker and enamel thinner are sold commercially as L-2080, L-403, LH-75 and MS-6 by BASF Corp.

These enamels were applied by air atomization over APS-422 primed cold rolled steel and polyurethane plastic panels. The coatings were allowed to cure at ambient room temperature overnight while some panels cured one week prior to testing. Dry film thickness was measured and determined to be approximately 2.0–2.3 mils of enamel.

The cured films demonstrated good adhesion, flexibility, dirt resistance etc, as shown below:

| | |
|---|---|
| Gloss (20° head) | 85.0 |
| Water Spot: | Excellent |
| Flexibility | Excellent |
| Humidity: | Excellent |
| Dirt Resistance: | Excellent |
| Water Spray: | Excellent |
| Adhesion: | Excellent |
| Print: | Excellent |
| Gas Resistance: | Excellent |

These results also revealed that although this system is isocyanate based, when the new flex additive is introduced in place of #891, the chemical resistance properties are enhanced.

Example 13

White Acrylic Gravel Protector

A white acrylic gravel protector was prepared as follows:

| | Part by Volume |
|---|---|
| White Acrylic Enamel | 666.67 |
| Product of EXAMPLE 5 | 333.33 |
| TOTAL | 1,000.00 |
| % Non Volatile: 42.46% (wt.) | |

The above enamel is sold commercially as L-2080 by BASF Corp.

This coating was applied by air atomization over APS-422 primed cold rolled steel. The coating was allowed to cure at ambient room temperature for one week. Dry film thickness was measured and determined to be approximately 5.0 mils of Gravel Protector. The cured film provided for excellent substrate adhesion and had good resistance to stone chipping when tested on the VW-stone-chip machine where it rated equally with isocyanate functional commercial material.

Example 14

Ultra High Solids Polyurethane Acrylic Clearcoat

A high solids polyurethane cross-linked acrylic clearcoat was prepared as follows:

|  | Parts by Volume |
|---|---|
| Ultra High Solids Polyurethane Acrylic | 444.45 |
| Urethane Catalyst | 222.22 |
| Product of EXAMPLE 5 | 333.33 |
| TOTAL | 1,000.00 |
| % Non Volatile: 36.11% (wt.) | |

The above ultra high solids polyurethane acrylic clearcoat and urethane catalyst are sold commercially as RV-86 and RV-87 by BASF Corp.

This coating was applied by air atomization over APS-422 primed and white acrylic lacquer basecoated (Alpha-Cryl) cold rolled steel and polyurethane plastic panels.

The coating was allowed to cure at ambient room temperature overnight while some panels cured one week prior to testing. Dry film thickness was measured and determined to be approximately 2.0 mils of clearcoat.

The cured films demonstrated good adhesion, flexibility, dirt resistance etc, as shown below:

| Gloss (20° head): | 86° |
|---|---|
| Water Spot: | Excellent |
| Flexibility: | Excellent |
| Humidity: | Excellent |
| Dirt Resistance: | Excellent |
| Water Spray: | Excellent |
| Adhesion: | Excellent |
| QUV: | Excellent |
| Gas Resistance: | Excellent |
| Print: | Excellent |

These test results also revealed that even though this system is isocyanate based, when the new flex additive is introduced in place of #891, some chemical resistance properties are enhanced.

Examples 15, 16, 17

Urethane Acrylic Clearcoats

Three urethane cross-linked acrylic clearcoats were prepared as follows:

|  | Parts by Volume |
|---|---|
| Acrylic Urethane clearcoat | 571.40 |
| Urethane crosslinker | 142.90 |
| Product of EXAMPLE 5 | 285.70 |
| TOTAL | 1,000.00 |
| Non Volatile: 29.53% (wt.) | |
| Fast cure acrylic urethane clearcoat | 571.40 |
| Urethane crosslinker | 142.90 |
| Product of EXAMPLE 5 | 285.70 |
| TOTAL | 1,000.00 |
| Non Volatile: 29.53% (wt.) | |
| High solids acrylic urethane clearcoat | 444.50 |
| Urethane crosslinker | 222.20 |

-continued

|  | Parts by Volume |
|---|---|
| Product of EXAMPLE 5 | 333.30 |
| TOTAL | 1,000.00 |
| Non Volatile: 36.15% (wt.) | |

The above acrylic urethane clearcoats and urethane crosslinkers are sold commercially as DC-88, DC-89, DC-90, DH-44 and DH-51 by BASF Corp. These clearcoats were applied by air atomization over DP-20 primed and Diamont basecoated cold rolled steel, and also over Diamont basecoated polyurethane plastic panels; also applied directly over polyurethane plastic panels.

The coatings were allowed to cure at ambient room temperature overnight while some panels cured one week prior to being tested. Dry film thickness was measured and determined to be approximately 2.0 mils of clearcoat.

The cured films demonstrated good adhesion, flexibility, dirt resistance etc. as shown below:

| Gloss (20° head): | 88° |
|---|---|
| Humidity: | Excellent |
| Flexibility: | Excellent |
| Gas Resistance: | Excellent |
| Dirt Resistance: | Excellent |
| Water Spot: | Excellent |
| Adhesion: | Excellent |
| Water Spray: | Excellent |
| QUV: | Excellent |
| Print: | Excellent |

COMPARATIVE EXAMPLE 18

An isocyanate functional urethane flexibilizer comprising: 34 percent aliphatic diisocyanate, 9 percent polyether polyol, 57 percent polyester polyol was prepared.

COMPARATIVE EXAMPLES 19-22

The isocyanate flexibilizer of COMPARATIVE EXAMPLE 28 was reacted with gamma-aminopropyltrimethoxysilane with remaining isocyanate reacted with mono-alcohol in proportions listed in the below table:

|  | Approximate percent of isocyanate equivalents reacted with aminosilane | Clarity of a commercial clear lacquer coating composition comprising the listed flexibilizer over a black lacquer |
|---|---|---|
| EXAMPLE 19 | 0% | CLEAR |
| EXAMPLE 20 | 25% | VERY SLIGHT HAZE |
| EXAMPLE 21 | 50% | HAZY |
| EXAMPLE 22 | 100% | VERY HAZY |

We claim:

1. A non-isocyanate functional flexibilizer having the formula:

B-C(O)-NW-A-NX-C(O)-K wherein A is selected from the group consisting of polyesters, polyamides, polyureas, polyurethanes, acrylics; biuret, allophonate and urethane extended polyesters; wherein B and K are selected from the group consisting of —OR and —Z—R'-SiOR"$_{(3-n)}$ R'"'$_n$ wherein R' is a divalent lower alkyl radical of from 1 to 18 carbon atoms, R is a lower alkyl radical of from 1 to 18 carbon atoms, Z is a member selected from the group consisting of S and NR'', w and x are selected from H, and lower alkyl radicals of from 1 to 10 carbon atoms wherein R'', R''' and R'''' are H or a lower alkyl radical of from 1-18 carbon atoms, and wherein n is 0, 1 or 2.

2. The non-isocyanate functional flexibilizer of claim 1, wherein B comprises from about 10 mole percent to 100 mole percent $-Z-R'-SiOR''_{(3-n)}R''''_n$ and from about 90 mole percent to 0 mole percent $-OR$, wherein R is a lower alkyl radical of from 1 to 18 carbon atoms, R' is a divalent alkyl radical of from 1 to 18 carbons, Z is selected from the group consisting of S and NR'', wherein R''' and R'''' are H or a lower alkyl radical of from 1-18 carbon atoms.

3. The non-isocyanate functional flexibilizer of claim 1, including a conventional silanol condensation catalyst.

4. The non-isocyanate functional flexibilizer of claim 3, wherein the catalyst is present in an amount of 0.5% to about 2% based on the weight of the total solids in the non-isocyanate functional flexibilizer.

5. The non-isocyanate functional flexibilizer of claim 4, wherein the catalyst is dibutyl tin dilaurate.

6. The non-isocyanate functional flexibilizer of claim 4, wherein the catalyst is present in an amount of from about 1.2% to about 1.6% based on the weight of the total solids in the non-isocyanate functional flexibilizer.

7. The non-isocyanate functional flexibilizer of claim 1 wherein R' is $CH_2CH_2CH_2$, R'' is $CH_3$, n is zero, R is $CH^2CH_2CH_2CH_3$, W, X are H, and Z is NH.

8. A flexible coating composition for metal and plastic substrate, comprising a coating composition and an effective amount of the additive of claim 1.

9. The composition of claim 8, wherein the additive is present in an amount of from about 2% to about 80% based on non-volatile.